Oct. 10, 1944.   G. W. GERSTUNG ET AL   2,360,123
OIL COOLER
Filed Sept. 18, 1942    2 Sheets-Sheet 1

Inventors
George W. Gerstung &
Hiram Walker
By Blackman, Spencer & Flint
Attorneys Patented Oct. 10, 1944

2,360,123

UNITED STATES PATENT OFFICE 2,360,123

OIL COOLER

George W. Gerstung and Hiram Walker, Lockport, N. Y., assignors to General Motors Corporation, Detroit, Mich., a corporation of Delaware Application September 18, 1942, Serial No. 458,830

2 Claims. (Cl. 257—2)

This invention has to do with heat exchangers and, more particularly, with coolers for the lubricating oil of the propelling engines and transmissions of military tanks.

In military tanks, the spaces available for coolers for the lubricating oil of the propelling engines and transmissions are limited and the conditions in the spaces are not favorable to extraction of heat from the oil in the coolers. Consequently, to cool the oil to the required degree coolers for the lubricating oil of the propelling engines and transmissions of military tanks must be highly efficient. To make an oil cooler highly efficient, it is, for well known reasons, necessary to construct it so that the oil passages in its core are small in at least one transverse dimension and oil flows through them not smoothly but turbulently to the extent that when the oil is cold and thick it will not pass through the passages unless excessive pressure is applied to it.

The principal object of this invention is to provide coolers for the lubricating oil of the propelling engines and transmissions of military tanks which will fit into the limited spaces available for them in the tanks and under the unfavorable conditions which obtain in the spaces cool the oil circulating through the engines and transmissions to the required degree whenever and as soon as the oil becomes, and as long as it remains, so hot that cooling of it is necessary and yet obviate application of excessive pressure to the oil to supply the engines and transmissions with oil when the oil is cold and thick.

For a better understanding of the nature and objects of this invention reference is made to the following specification and the accompanying drawings in which the preferred embodiment of the invention is described and illustrated.

Figure 1:
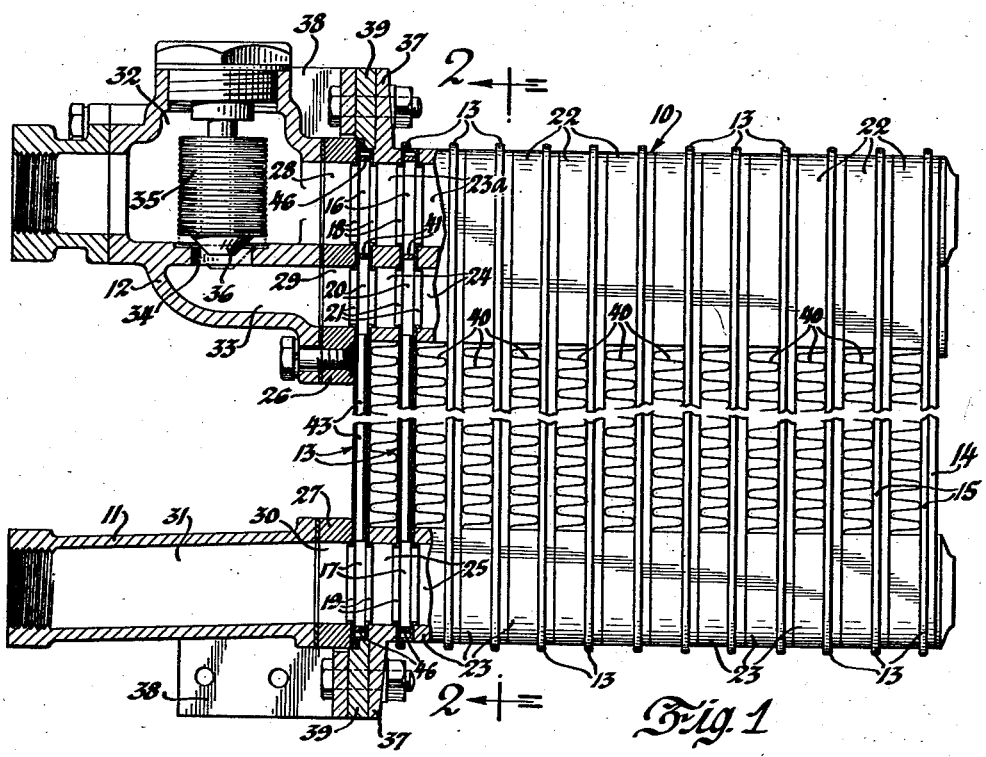
Figure 1 is a side elevation, with parts broken away and in section, of an oil cooler in which our invention is embodied.
Figure 3:
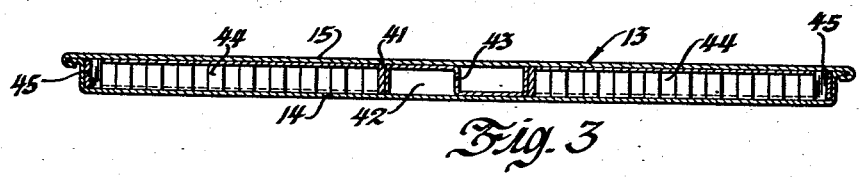
Figure 3 is a further enlarged section through one of the tubes included in the cooler taken as indicated by the line 3—3 of Figure 2.
Figure 4:
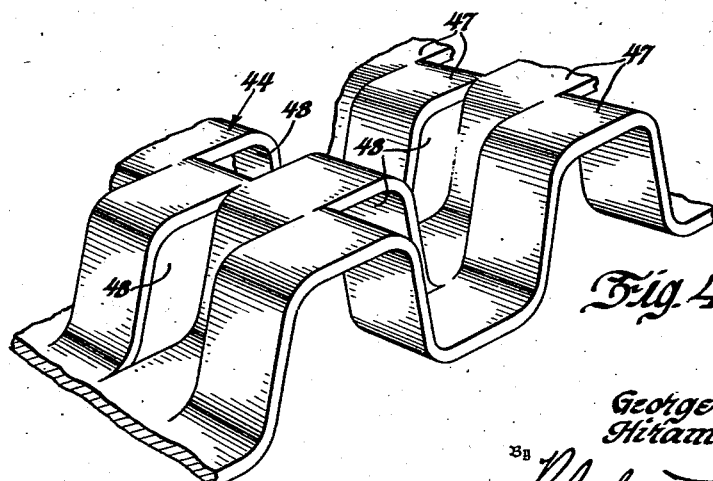
Figure 4 is a still further enlarged fragmentary perspective view of one of the turbulent plates disposed within the tubes of the cooler.
Figure 2:
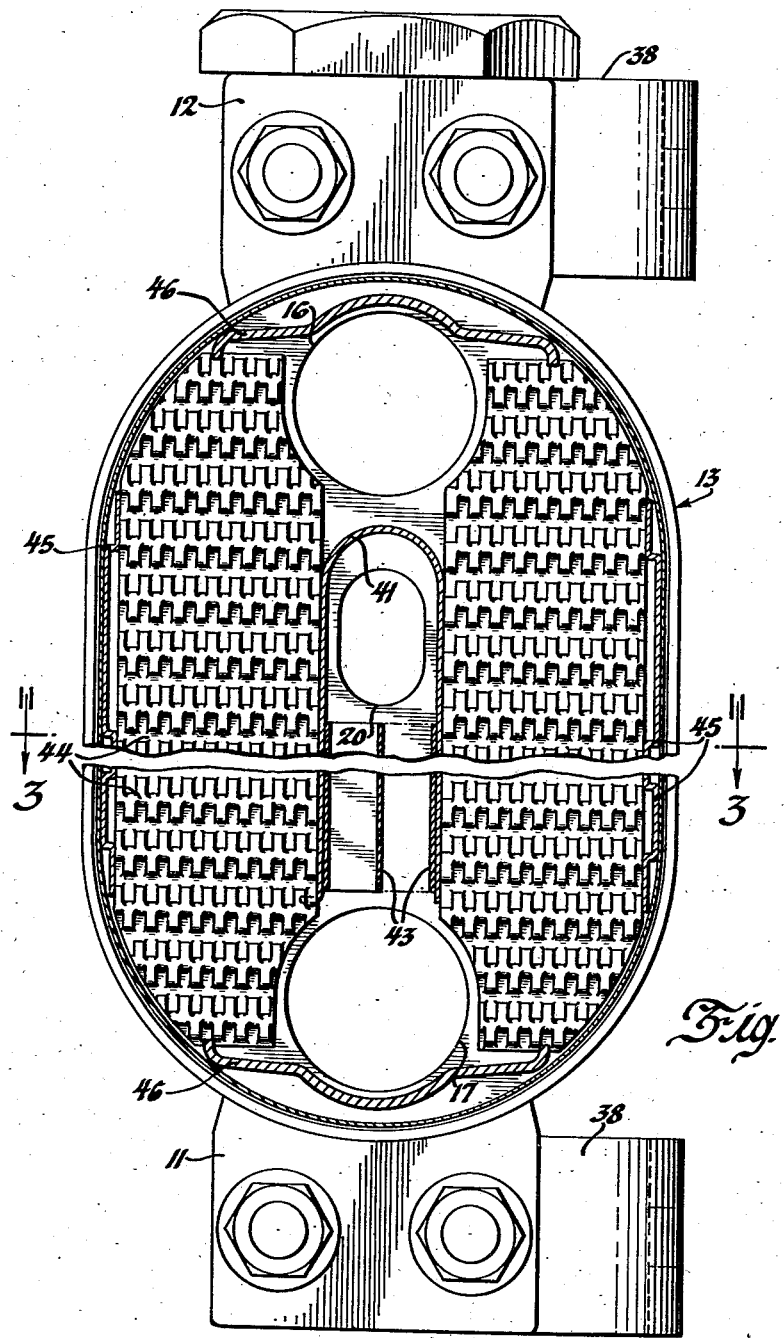
Figure 2 is an enlarged view of the cooler taken as indicated by the line 2—2 of Figure 1.

The oil cooler which is shown in the drawings consists of a core 10 and oil inlet and outlet fittings 11 and 12.

The core 10 includes a number of flat tubes 13 which are disposed parallel to and in registration with each other but spaced apart so that air can pass between them. Each of the tubes 13 consists of shallow elongated tray-like member 14 with a flange on its rim and an elongated plate 15 whose margin is folded around and metallically bonded to the flange. Through the bottom of the tray-like member 14 and the plate 15 of each tube, except the outermost, there extend near their ends circular openings 16 and 17 encircled by flanges 18 and 19 and, between the openings 16 and 17, near the openings 16, elongated openings 20 encircled by flanges 21. Corresponding openings are formed in the plate 15 of the outermost tube but the tray-like member thereof is left imperforate.

The tubes 13 are secured together and spaced apart by a plate 22 and a disk 23 between each of the adjacent pairs of tubes. Each of the plates 22 is disposed between the openings 16 and 20 in one of each of the adjacent pairs of tubes and has in it openings 23a and 24 into which are telescoped the flanges 18 and 21 which encircle the openings 16 and 20 in the tubes. Each of the disks 23 is disposed between the openings 17 in one of each of the adjacent pairs of tubes and has in it an opening 25 into which are telescoped the flanges 19 which encircle the openings 17 in the tubes. Each of the plates 22 and disks 23 is, of course, metallically bonded to the tubes between which it is disposed. Between each of the adjacent pairs of tubes 13 there is disposed a corrugated sheet 40 whose crests are metallically bonded to the tubes between which it is disposed and which serves to expedite the transfer of heat from the oil flowing through the tubes to the air passing between the tubes.

To the plate 15 of the innermost of the tubes 13 there are metallically bonded a plate 26 and a disk 27 which are similar to but heavier than the plates 22 and disks 23. The plate 26 is disposed over the openings 16 and 20 in the plate 15 and has in it openings 28 and 29 into which are telescoped the flanges 18 and 21 which encircle the openings 16 and 20 in the plate 15. The disk 27 is disposed over the opening 17 in the plate 15 and has in it an opening 30 into which is telescoped the flange 19 which encircles the opening 17 in the plate 15. On the disk 27 is mounted the inlet fitting 11 which has in it a passage 31 which communicates with the opening 30 in the disk 27. On the plate 26 is mounted the outlet fitting 12 which has in it passages 32 and 33 which at one end communicate with the openings 28 and 29 in the plate 26. At its other end the passage 33 opens into the passage 32 through a port 34 in the wall which separates the passages. In the passage 32 there is disposed a bellows thermostat 35 with a frusto-conical valve 36 on its free end which seats in the port 34 when the thermostat is hot and extended and is unseated when the thermostat is cold and contracted and thus closes the port 34 when the thermostat is hot and opens it when the thermostat is cold.

On the plate 22 and the disk 23 between the innermost pair of tubes 13 there are provided wings 37 to which are secured brackets 38 by which the oil cooler may be mounted on a suitable support. Between the brackets 38 and wings 37 are disposed plates 39, on which there are portions of reduced thickness which underlie the flange on the innermost tube and thus obviate crushing of the ends of the innermost tube as a result of handling of the inlet and outlet fittings.

A strip of metal 41 shaped like an elongated hairpin is disposed within each of the tubes 13 and metallically bonded to the tray-like member 14 and plate 15 thereof with its open end near and facing the opening 17 and the opening 20 within its confines near its closed end. Within the duct 42 defined by the hairpin-like member 41, there is disposed a strip of metal 43 square-S-shaped in cross section which extends from near the opening 20 to near the opening 17 and is metallically bonded to the tray-like member 14, the plate 15 and the hairpin-like member 41 to prevent distortion of the tube by internal pressure.

Within each of the tubes 13 on each side of the hairpin-like member 41 there is disposed a turbulent plate 44. Between the sides and ends of the turbulent plates and the rim of the tray-like member of all of the tubes 13, except the innermost, there are disposed locating and reinforcing strips 45 and 46 which are metallically bonded to the tray-like member and plate of the tube. Between the ends of the turbulent plates and the rim of the tray-like member of the innermost of the tubes 13 there are also disposed locating and reinforcing strips 46 which are metallically bonded to the tray-like member and plate of the tube but the turbulent plates in this tube are wide enough to extend to the rim of the tray-like member of the tube and there are no locating and reinforcing strips corresponding to the locating and reinforcing strips 45 in the other tubes in it.

Each of the turbulent plates 44 consists of a sheet of metal deformed to provide in it transversely corrugated strip-like elements 47 which extend lengthwise of the plate and are disposed edge to edge with the corrugations in alternate elements arranged crosswise of the plate in rows displaced lengthwise of the plate from the corrugations in the other elements a distance equal to about one-half of the length of a corrugation. The corrugations in the elements 47 are approximately rectangular in contour and are flat crested and the adjoining elements of each plate are, except where the crests of their corrugations overlap, separated from each other to provide openings 48 through which oil may pass from one corrugation to another lengthwise of the plate. The crests of the corrugations in the turbulent plates 44 are metallically bonded to the tray-like member and the plate of the tube 13 within which the turbulent plates are disposed and, in addition to the function indicated by their name, the turbulent plates also serve to transmit heat from the oil within the tube to the tray-like member and plate of the tube 13 within which they are disposed and to prevent distortion of the tube by internal pressure.

The oil cooler shown in the drawings and hereinbefore described was designed for installation in the lubrication system of the engine or transmission of a military tank so oil enters it by way of the inlet fitting 11 and leaves it by way of the outlet fitting 12. The oil which enters the cooler passes from the inlet fitting 11 into the duct defined by the openings 17 in the tubes 13 and, thence, into the tubes 13. The oil may pass through and from the tubes 13 into the outlet fitting 12 by either of two paths. One is by way of the ducts 42 defined by the hairpin-like members 41, the duct defined by the openings 20 in the tubes 13 and the passage 33 in the outlet fitting 12. The ducts 42, which are more resistive to the passage of oil than any other part of the path, are of such size and character that oil, even when cold and thick, may pass through them without application of excessive pressure to it. The other path is by way of the passages in the tubes 13 on the sides of the ducts 42 in which are disposed the turbulent plates 44, the duct defined by the openings 16 in the tubes 13 and the passage 32 in the outlet fitting 12. The turbulent plates 44 increase to a high value the efficiency of transfer of heat from the oil within the passages in which they are disposed to the outer walls of the tubes 13. But, although they do not render the passages in which they are disposed so resistive to the passage of oil that oil cannot when it is hot and thin pass quite freely through them, without application to it of greater pressure than normally obtains in the lubricating system of the engine or transmissions in which the coolers are installed, the turbulent plates do inherently render these passages so resistive to the passage of oil that when the oil is cold and thick it cannot pass through them unless excessive pressure is applied to it.

When the oil is hot and thin, as it ordinarily will be when the engine and transmission have been operating for some time, the thermostat 35 will be extended and the port 34 closed by the valve 36. Under this condition, the oil will be constrained to take the path last mentioned through which it can pass quite freely under the influence of the pressure which normally obtains in the lubricating system, and will be highly efficiently cooled in the course of its passage through the cooler.

However, when the oil is cold and thick, as it ordinarily will be when the engine and transmission have not been operating for some time or may become as a result of over-cooling, the thermostat 35 will be contracted and the port 34 open. Under this condition, the oil will naturally take the path first mentioned through which it even when cold and thick can pass without application of excessive pressure to it. Thus it is assured that, even when the oil is cold and thick the engine or transmission will be supplied with oil without application of excessive pressure to the oil.

While the oil passes through the cooler by way of the path under consideration it will, of course, be cooled very little and, consequently, under this condition, the temperature of the oil circulating through the engine or transmission will rise with the maximum rapidity. Heat from the oil in the ducts 42 will be transferred through the walls of the ducts to the oil in the passages in the tubes 13 on the sides of the ducts and, consequently, by the time the oil circulating through the engine or transmission becomes so hot and thin that cooling of it is necessary the oil in the passages last mentioned will be warm and thin enough that it can pass therethrough without the application of excessive pressure to it. When the oil circulating through the engine or transmission becomes so hot and thin that cooling of it is necessary the thermostat 35 will extend and seat the valve 36 in and close the port 34. Thereafter, the oil will pass through the cooler by way of the path which includes the passages in the tubes 13 on the sides of the ducts 42 and, consequently, be cooled to the necessary extent. If the oil, thereafter, becomes over-cooled and thick, the thermostat 35 will contract and unseat the valve 36 whereupon passage of oil through the cooler by way of the path which includes the duct 42 will re-commence and continue until the oil again becomes so hot and thin that cooling of it is necessary. It will, of course, be understood that movement of the valve 36 to and from the positions in which the port 34 is closed and fully open takes place, not instantaneously, but gradually, and consequently, when the oil is between hot and cold it will pass through the cooler in part by way of one and in part by way of the other of the mentioned paths and may continue to do this for an extended period if cooling of only a part of the oil is required to bring it to its optimum temperature.

We claim:

1. In a temperature regulator for fluids like lubricating oils whose viscosities increase when their temperatures decrease, a plurality of flat members within each of which there are ducts which extend lengthwise of and from one to the opposite side wall of the member and through which the fluid may flow when it is hot but offer undue resistance to passage of the fluid when it is cold, the members being disposed substantially parallel to and in registration with each other but spaced apart so that fluid may flow between and around them in heat exchanging relation to fluid in the specified ducts within them, a duct within each of the members which extends lengthwise of and from one to the opposite side wall of the member between the first specified ducts and through which the first mentioned fluid may when it is warm flow in heat exchanging relation to the fluid in the first specified ducts without encountering undue resistance, a duct which extends through the several members near corresponding ends of the members and communicates with the ducts within the members, a duct which extends through the several members near the other ends of the members and communicates with the second specified ducts within the members, a duct which extends through the several members between the two ducts last specified and communicates with the second specified ducts within them, and means movable from a position in which it permits passage of the first mentioned fluid through the second specified ducts within the members and the last specified duct when it is cold to a position in which it obstructs passage of the first mentioned fluid through the last mentioned ducts when it is hot.

2. In a temperature regulator for fluids like lubricating oils whose viscosities increase when their temperatures decrease, a flat hollow member, a member generally square-S-shaped in cross section which is disposed within and extends lengthwise of the flat hollow member between its edges and divides the interior of the flat hollow member into ducts which extend lengthwise of and from one to the opposite side wall of the flat hollow member on each side of the member which is generally square-S-shaped in cross section and through which the fluid may flow when it is hot but offer undue resistance to passage of the fluid when it is cold and ducts which extend lengthwise of and from one to the opposite side wall of the flat hollow member between the first mentioned ducts and through which the first mentioned fluid may when it is warm flow in heat exchanging relation to the fluid in the first mentioned ducts without encountering undue resistance, the flat hollow member being disposed so that fluid may flow around it in heat exchanging relation to the fluid in the first mentioned ducts and means movable from a position in which it permits passage of the first mentioned fluid through the second mentioned ducts when it is cold to a position in which it obstructs passage of the fluid through the second mentioned ducts when it is hot.

GEORGE W. GERSTUNG.
HIRAM WALKER.